July 23, 1963  L. A. DE ROSA  3,099,006
NAVIGATION SYSTEM
Filed March 2, 1960  5 Sheets—Sheet 1
Fig.1a
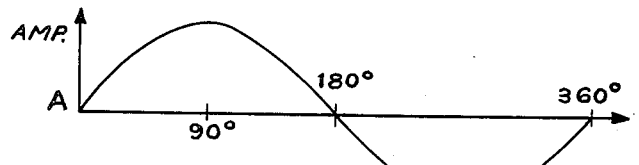
Fig.1b
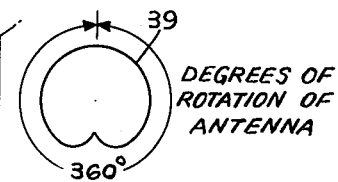
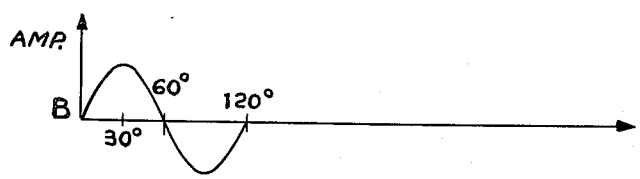
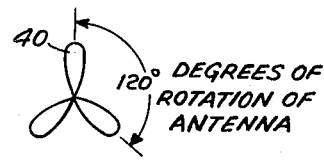
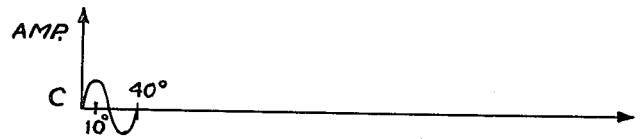
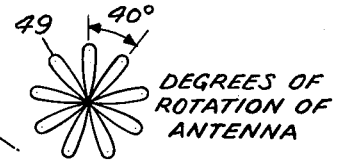
Fig.5a
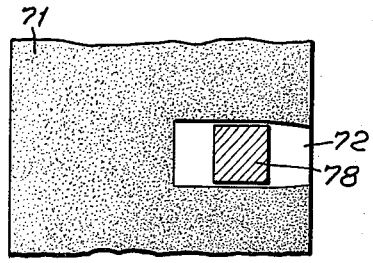
Fig.5b
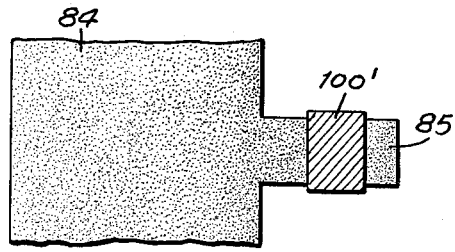
INVENTOR.
LOUIS A. DE ROSA
BY Isidore Togut
ATTORNEY

INVENTOR.
LOUIS A. DE ROSA
ATTORNEY

July 23, 1963
L. A. DE ROSA
3,099,006
NAVIGATION SYSTEM
Filed March 2, 1960
5 Sheets-Sheet 3
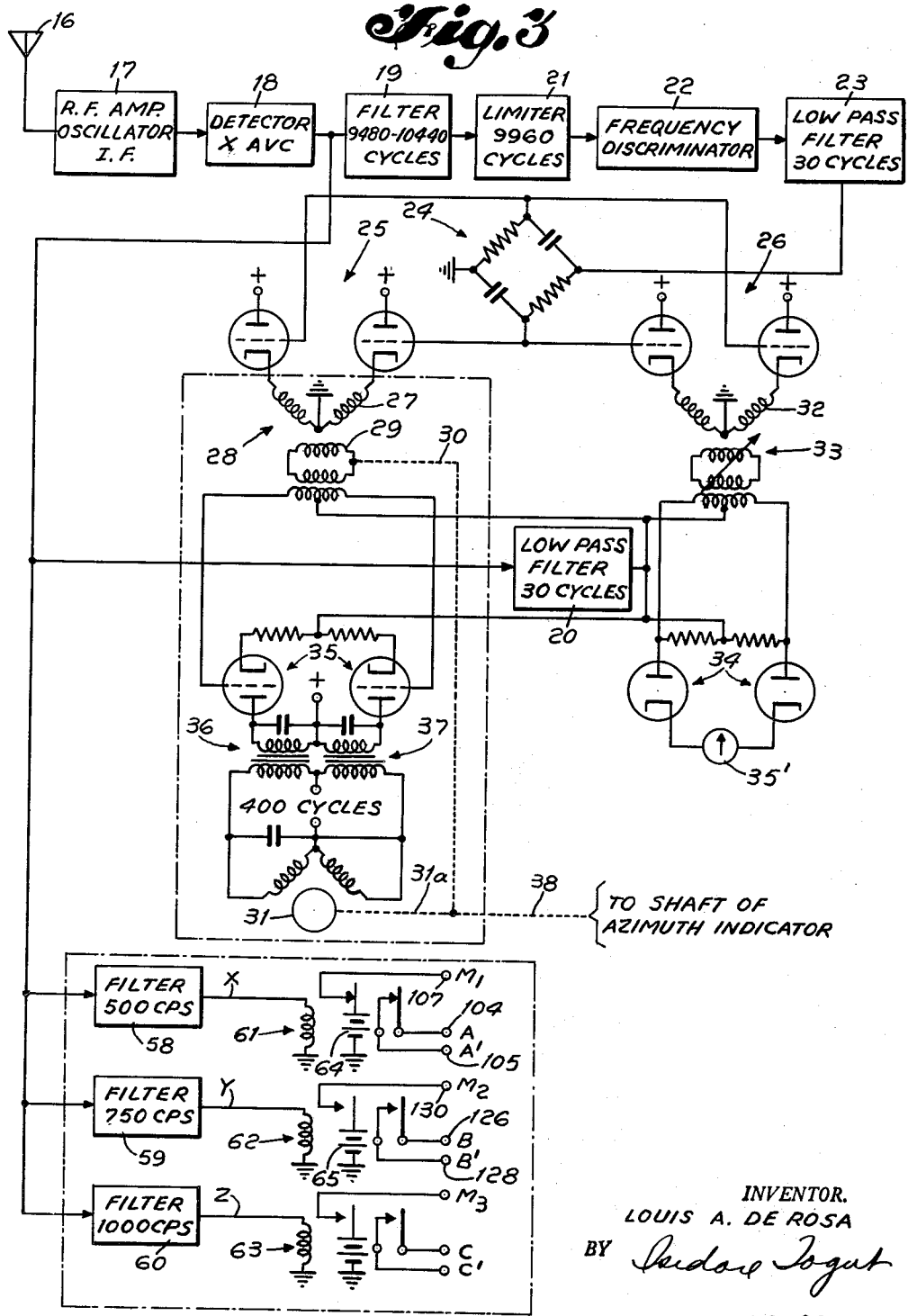
INVENTOR.
LOUIS A. DE ROSA
BY *Isidore Togut*
ATTORNEY

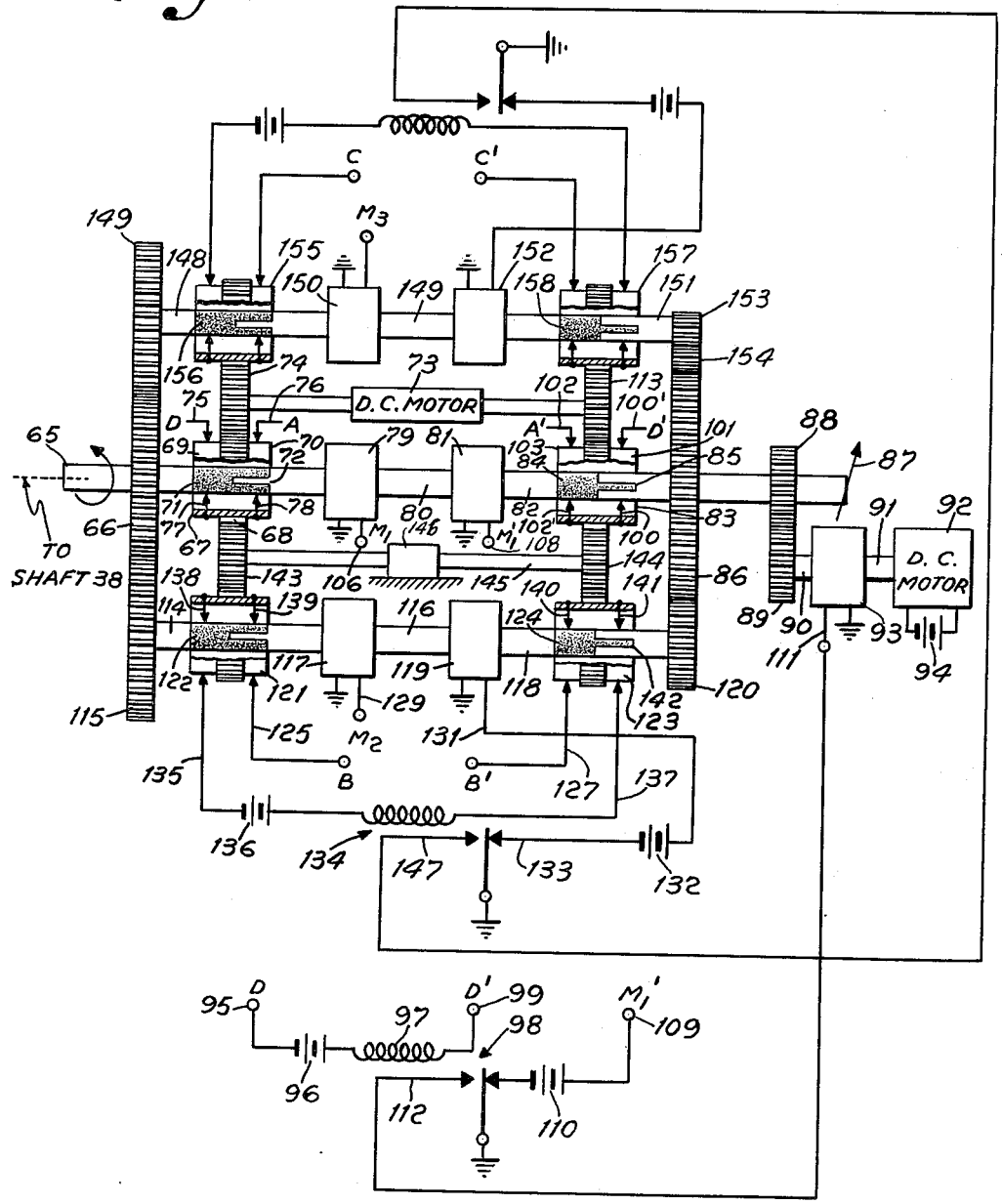

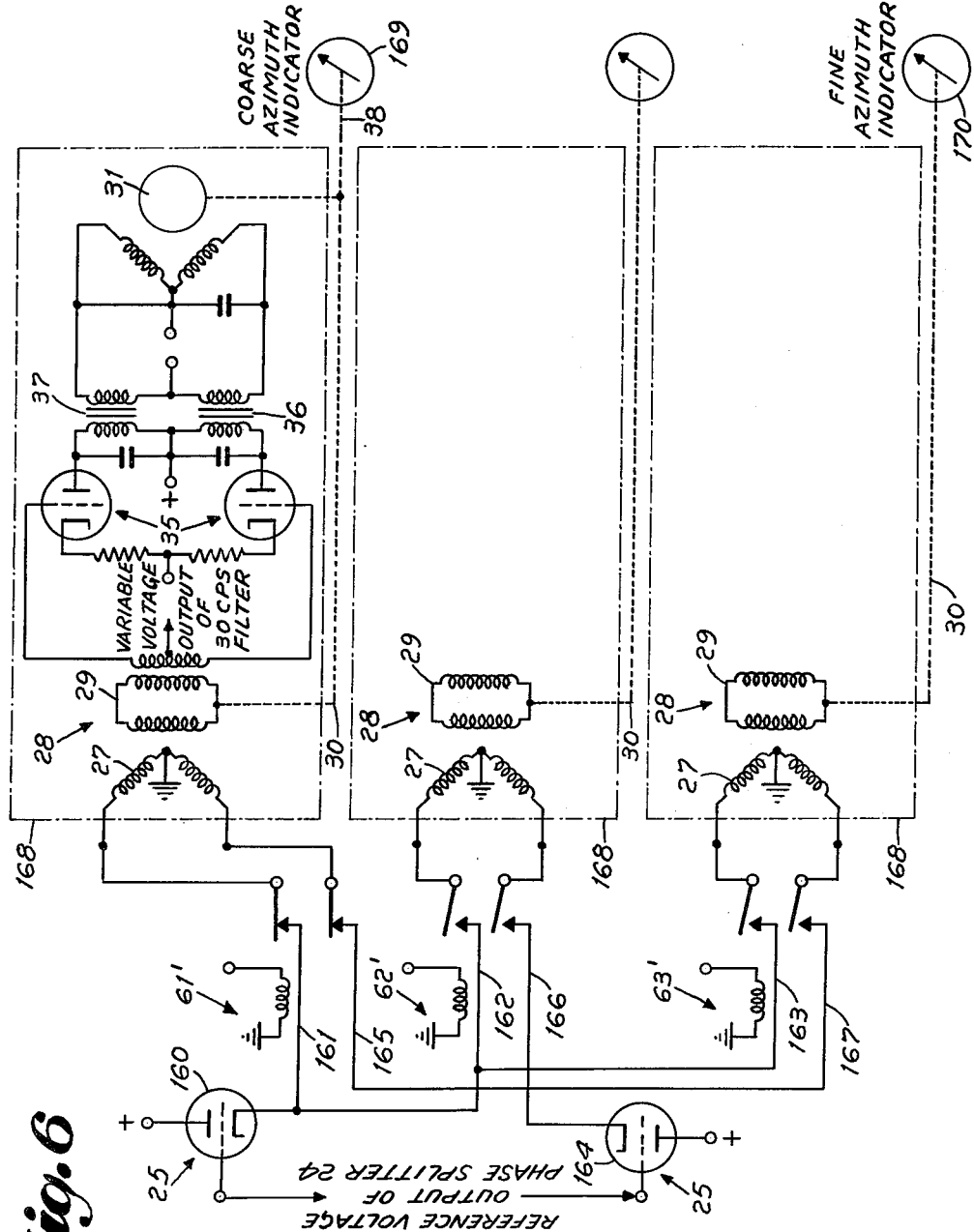

United States Patent Office 3,099,006
Patented July 23, 1963

3,099,006
NAVIGATION SYSTEM
Louis A. De Rosa, Upper Montclair, N.J., assignor to International Telephone and Telegraph Corporation, Nutley, N.J., a corporation of Maryland
Filed Mar. 2, 1960, Ser. No. 12,390
16 Claims. (Cl. 343—106)

This invention relates to omnirange navigation systems for aircraft and more particularly to omnirange navigation systems of the phase comparison type.

The very high frequency omnirange navigation system for aircraft VOR is the navigation system most largely used in the airways of the United States. In the VOR system the VOR transmitter operates in the frequency band 108 to 118 mc., and is associated with an antenna system that in any instant has a directional pattern that is a cardioid or a limaçon, which rotates at a rate of 30 revolutions per second. The rotation of the unsymmetrical antenna pattern causes a signal at the particular receiving point to be amplitude modulated at a 30 cycle rate, with the phase of the 30 cycle modulation being determined by the bearing of the transmitting station relative to the receiver, that is, the aircraft. A reference phase independent of bearing is supplied to the receiver by frequency modulating a 9960 cycle wave at a 30 cycle frequency in synchronism with the rotation of the antenna pattern, and then amplitude modulating this frequency sub-carrier on the radiated carrier. The phase of this reference 30 cycle frequency modulation is such that it is in phase with the 30 cycle modulation due to antenna rotation when the receiving point is due north of the VOR. The aircraft VOR receiver is typically a high-quality super-heterodyne provided with means for recovering and separating the audio-frequencies obtained from the complex signal radiated by the VOR. The phase difference between the 30 cycle signal due to the pattern rotation and the 30 cycle reference signal is determined by phase discrimination methods and that is the bearing of the aircraft from the VOR relative to north. The accuracy of the VOR system is typically within less than ±1.5°. There are certain disadvantages of the VOR system. One is that the bearing accuracy is not sufficient for the high speed aircraft operating today, secondly the VOR system suffers from direction errors which are due to the siting requirements of the VOR system. One attempt to provide for greater bearing accuracy and for more freedom from sighting errors is provided in TACAN. In TACAN greater bearing accuracy is provided by the addition of a nine lobe signal in combination with the cardioid single lobe signal, which provides greater bearing accuracy and also reduces considerably siting errors. TACAN as is well known has been adopted by the United States Navy for aircraft carrier operation and has proved successful in use. It would be desirable to provide similar bearing accuracy and freedom from siting errors in the VOR system at the minimum of replacement of equipment in the ground station and at a minimum replacement or addition to the VOR equipment carried by the aircraft.

It is, therefore, an object of this invention to provide for an improved very high frequency omnirange navigation system which provides for greater accuracy than is secured from the present VOR system and will also provide for much greater freedom from siting errors.

Still other objects include the provision of an omnirange navigation beacon for transmitting a plurality of sequentially transmitted radiation patterns for greater accuracy, and the provision of a receiver adapted to receive said sequentially transmitted radiations and indicate the bearing of the receiver relative to the beacon.

A feature of this invention is an omnirange navigation system for determining the bearing of an object relative to a transmitter that comprises means to transmit sequentially rotating electro-magnetic radiation at a fundamental frequency and at least one harmonic frequency of the fundamental frequency, each of said radiations containing reference phase signals and variable phase signals. Means are carried by the object to receive the sequential radiations and responsive to the reference phase signals and the variable phase signals of the fundamental frequency radiation and the harmonic frequency radiation the bearing of the object relative to the transmitter is indicated on the bearing indicator.

Another feature is that the sequential radiation of the fundamental frequency and the harmonic frequencies are accomplished by rotating separate antennas at different speeds. The antenna radiating the fundamental frequency or the cardioid or single lobed radiation would rotate at $n$ r.p.m. A second antenna radiating a three lobed beam would rotate at a speed one third that of the cardioid rotation or fundamental frequency and a third antenna radiating a nine lobe beam would rotate at one ninth of the speed of the cardioid lobed antenna.

Still another feature is that each radiation thus sequentially transmitted would also carry with it a distinguishing tone frequency which can be separated out in the air-borne receiver to trigger the azimuth indicator to indicate the bearing according to the type of signal then being received, whether the fundamental frequency signal or any harmonic thereof.

These and other features and objects of this invention will become more apparent by reference to the following description taken in conjunction with the accompanying drawings, in which:

FIG. 1A is a group of wave forms useful in explaining the operation of this invention;

FIG. 1B is a group of diagrams illustrating the different radiation beams and rotations;

FIG. 3 is a block diagram of the air-borne receiver together with modifications for utilizing the different radiations both fundamental and harmonics.

FIG. 4 is a combination block diagram and mechanical arrangement of the modifications to the azimuth indicator of the VOR receiver.

FIGS. 5A and 5B show expanded views of certain portions of FIG. 4; and

FIG. 6 is a block diagram of an alternative embodiment utilizing the principles of this invention.

Figure 2:
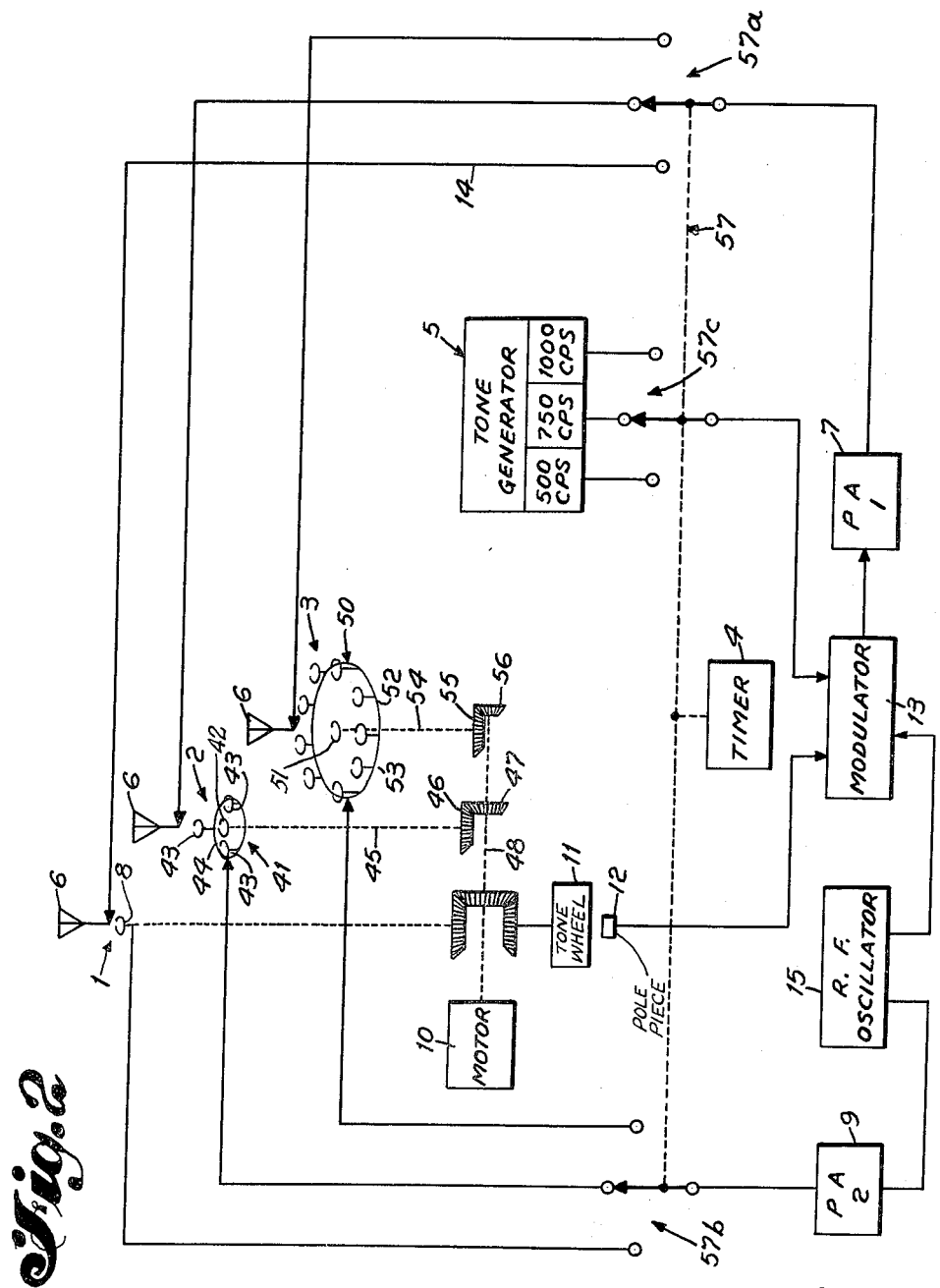
FIG. 2 is a block diagram of the transmitter utilizing the principles of this invention.

It is useful before proceeding with a description of the invention herein to describe the operation of a VOR transmitter and receiver as presently being used. With reference now to FIGURES 2 and 3 there is shown a transmitting antenna 1 which for purposes of the explanation of the VOR system will be the only transmitting antenna considered herein. The other two antennas 2 and 3 together with the timer 4 and the tone generator 5 are part of the invention and will be described later on. The antenna 1 shown herein is shown purely for purposes of illustration and any other antenna device or combination that will produce a rotating cardioid can be substituted for the one shown herein. The antenna 1 comprises a horizontal loop antenna 6 to which is coupled a reference phase voltage from a power amplifier 7. A dipole 8 is disposed centrally of the horizontal antenna 6 and is rotated by means of a motor 10 at a rate of 30 c.p.s. Dipole 8 is connected to a source of radio frequency energy power amplifier 9. The combination of the fixed antenna 6 together with the rotating dipole element 8 provides a cardioid radiation pattern which rotates at the rate of 30 c.p.s. The same audio frequency which is 30 c.p.s. is also used to frequency modulate a higher frequency tone of the frequency of 9960 cycles, with a frequency deviation equal to 480 cycles. This frequency modulation is secured by means of a tone wheel 11 which is rotated by the motor 10 at the rate of 30 c.p.s. The tone wheel is a gear tooth wheel that rotates in front of a pole piece 12 on which a coil is mounted. The gear teeth on the tone wheel are made of magnetic material and the pole piece is a permanent magnet. The teeth of the wheel have variable spacing to generate in the coil a nominal frequency of 9960 cycles modulated at a 30 cycle rate. This subcarrier already frequency modulated is then applied to amplitude modulate the carrier frequency by means of the modulator 13. The frequency modulated signal is then amplified in power amplifier 7 and transmitted by way of conductor 14 to the fixed antenna 6 of the antenna 1. The variable phase voltage is produced by the output of the R-F oscillator 15 (which is also fed to the power amplifier 7) that is coupled to the power amplifier 9 from whence it is coupled to the dipole 8. That is the variable phase signal which is the unmodulated carrier frequency. The received signals are received by the aircraft via the antenna 16 which is coupled to the R-F amplifier oscillator and intermediate frequency amplifier 17. The reference phase signals, the bearing phase signals (which is a function of the dipole rotation) and the variable phase signals are then detected in the detector 18, the output of which is then fed to the filter 19 and the 30 cycle low-pass filter 20 to provide bearing indication as will be described.

The filter 19 has a pass band of from 9480 to 10,440 cycles as these are the sub-carrier frequencies that provide the reference phase signal. Following the band pass filter 19 there is a limiter 21 that eliminates all amplitude modulations. The output of the limiter 21 is 9960 cycle tone that is frequency modulated at a 30 cycle rate. This tone passes through a frequency discriminator 22 that recovers the 30 cycle reference phase signal. To eliminate all signals other than the 30 cycle tone the reference signal is then passed through a low-pass filter 23. The output of the low-pass filter 23 is fed into a phase splitter 24 that produces 2 outputs having a 90° phase relation to each other. These waves are then passed through two sets of cathode followers 25 and 26, each set actuating a separate bearing indicator circuit. The purpose of the cathode followers is to isolate the two bearing indicator circuits so that they will not react on each other. The output of the cathode followers set 25 goes to the stationary coil 27 of a phase shifter 28. The rotor 29 of the phase shifter 28 is driven by means of shaft 30 by an induction motor 31. The output of cathode follower set 26 is fed into the stationary coil 32 of a phase shifter 33. Phase shifter 33 is operated manually and is called a bearing selector. The output of the bearing selector or phase shifter 33 is connected to a phase detector 34 and the output of the phase detector 34 is coupled to a right-left indicator 35'. The output of the linear detector 18 in addition to connecting to the 9960 cycle filter 19 is also coupled to the 30 cycle low-pass filter 20. This filter recovers the variable phase signal. It is important that the characteristic of the 30 cycle filter that recovers the variable phase signal be identical to the one that follows the frequency discriminator 22, otherwise there would be a difference in the shift to the phase of the variable and the reference tone that would lead to bearing errors. The variable phase signal is also coupled to the phase detector 34 and the phase detector 35. The output of the phase detector 34 operates the vertical needle of the cross pointer right-left indicator. When the bearing of the aircraft from the ground station is equal to the bearing that has been set on the bearing selector 33, there is no deflection of the needle. If there is a difference between the selected and the actual bearing the needle deflects to the right or to the left. The system is so adjusted that a variation in bearing of 30° causes a deflection of the needle from full scale right to full scale left.

The output of the motor-driven phase shifter 28 goes to the second phase detector 35. In this detector there are compared the output of the motor-driven phase shifter 28 and the variable phase signal. The output of the phase detector 35 controls two saturable reactors 36 and 37 connected in series with the windings of a split phase induction motor 31. The motor 31 therefore is energized until the phases of the variable and reference signals (as they appear in the phase detector 35) are equal. The position of the shaft 30 connecting the rotor of the induction motor 31 and the rotor 29 of the phase shifter 28 is indicated on a dial (not shown) of the azimuth indicator the shaft 38 of which is coupled to the motor shaft 31A of the motor 31. The position of the shaft as read on this dial is indicative of the phase relation between the variable and the reference phase signals and therefore represents the relative bearing between the omnidirectional range station and the receiving equipment.

This invention provides for a unique improvement in the VOR navigation system by the use of harmonics in the transmitted pattern. In considering the cardioid (fundamental) the phase angle of the variable phase signal relative to a bearing signal is equivalent to the azimuth angle between the receiver and the transmitter. In the case of the $n$th harmonic the phase is $n$ times the azimuth angle. In using a transmitted pattern containing a number of harmonics, the over-all effect is that of the addition of two or more complex identical wave shapes which differ from each other only in terms of a time delay. The resultant wave shape is then different in appearance from the original. It is the fact that this effect takes place that enables me to make use of the information available from the harmonics. Although each harmonic can suffer as great an electrical phase shift as the fundamental described above, the azimuth shift of a harmonic lobe for a given electrical phase shift is inversely proportional to the order of the harmonic. Thus if a maximum shift of the fundamental under certain conditions may be 3° the azimuth shift of the tenth harmonic, for example, will be $3/10$ of a degree. The term harmonic used here is the number of lobes in a particular radiation pattern.

With reference to FIGURES 1A, 1B, and 2 there is shown an array of antennas to generate the fundamental and harmonic radiations. The generation of the cardioid or fundamental 39 shown in FIGURE 1B by the antenna 1 has already been described. Antenna 2 will produce a three lobed radiation pattern 40, each lobe being spaced apart 120°. This pattern is produced as follows: antenna 2 comprises a reference phase antenna 6 similar to the reference phase antenna 6 of antenna 1. Associated with the reference phase antenna 6 of antenna 2 is a dipole array 41 consisting of a centrally disposed dipole 42 and three dipoles disposed equidistant from each other and equidistant radially from center dipole 42. All the dipoles are mounted for rotation on a disc 44 which is connected by means of a shaft 45 to a bevel gear 46 which mates with a bevel gear 47 that in turn is driven by shaft 48 connected to the motor 10. The gear ratio of gear 47 to gear 46 is such that the dipole array 41 will rotate at one third the speed of gear 47 and also one third the speed of rotation of dipole 8 of antenna 1. Antenna 3 will produce a nine lobed radiation pattern 49, each lobe being spaced apart 40°. This pattern is produced in the following manner. Antenna 3 comprises a reference phase antenna 6 similar to the reference phase antenna 6 of antennas 1 and 2. Associated with reference phase antenna 6 of antenna 3 is a dipole array 50 consisting of a centrally disposed dipole 51 and 9 dipoles 52 disposed equidistant from each other and equidstant radially from center dipole 51. The dipoles 51 and 52 are mounted for rotation on a disc 53 which is rotated by shaft 54 that is connected to a bevel gear 55. Bevel gear 55 mates with a bevel gear 56 which is driven by motor 10 through shaft 48. The ratio of bevel gear 55 to bevel gear 56 is such that one rotation of bevel gear 55 and therefore of the dipole array 50, is equivalent to 9 rotations of bevel gear 56. Thus it is seen that in the same period of time dipole 8 of antenna 1 will rotate 360°, dipole array 42 of antenna 2 will rotate 120°, and dipole array 50, 40°. That is, in the same period of time the cardioid lobe 39 of antenna 1 will sweep through 360° of azimuth, each lobe 40 of the three lobe pattern of antenna 2 will sweep through 120° of azimuth and each lobe 49 of the nine lobe antenna pattern will sweep through 40° of azimuth. The radiation pattern of each antenna of the antenna arrays is illustrated in FIG. 1A where the polar coordinate patterns have been replotted in rectangular coordinates producing a sine wave. Each abscissa of wave forms A, B, and C of FIG. 1A represents the degrees of rotation of, respectively, antennas 1, 2, and 3. It is thus seen that the cardioid will produce one cycle of a sine wave in 360 degrees of rotation of the antenna, antenna 2 will produce a one cycle of a sine wave in 120° rotation of the antenna. The fundamental, the third harmonic, and the ninth harmonic radiation pattern are transmitted sequentially. This is accomplished by means of a switch 57 which is a three pole three position switch. One pole 57A of the switch is connected to the output of power amplifier 7 and each of the three positions is fed respectively to the reference phase antenna 6 of each of the antennas. The second pole 57B of the switch 57 is connected to the output of the power amplifier 9 and each of the three positions associated with that section is coupled respectively to the rotating dipole array of each of the antennas 1, 2, and 3. The third pole 57C of switch 57 is connected to the modulator 13 and selects from 3 tones signals generated by the tone generator 5. The poles of switch 57 are connected to the timer 4 which will sequentially move the poles to the proper position for transmission of the respective radiation patterns. A distinctive tone is transmitted with each radiation pattern by means of the output of the tone generator 5. For the fundamental cardioid pattern there is transmitted a 500 c.p.s. tone, for the three lobe radiation pattern or the third harmonic a 750 c.p.s. tone and for the nine lobe radiation pattern the ninth pattern a 1000 c.p.s. tone. These various tones are switched together with the output of the power amplifiers 7 and 9.

The operation of the airborne receiver in the VOR system has already been described. We will now describe the operation of the improved version of the VOR according to the principles of this invention. The output of the detector 18 is also coupled to three filters, a 500 c.p.s. filter 58, a 750 c.p.s. filter 59 and a 1,000 c.p.s. filter 60. The purpose of the filters, of course, is to separate the distinctive tones transmitted for the specific radiation pattern. Referring now to FIGURES 3, 4, 5A and 5B which disclose the preferred embodiment of this invention, the output of the 500 c.p.s. filter 58 is coupled to a relay 61 which is a two pole single throw relay. The output of the 750 c.p.s. filter 59 is coupled to a similar relay 62 and the output of filter 60 is coupled to similar type relay 63. Each of the relays 61, 62 and 63 are normally open. When a tone output of any of the filters 58, 59, and 60 is fed to its respective associated relay then the contacts will close as is shown in FIGURE 3 for relay 61. One set of contacts will close a circuit comprising a source of D.C. power 64 which is coupled to ground and also to a terminal 107. The other set of contacts will close a circuit having terminals 104 and 105. The other two relays 62 and 63 have similar terminals 130, 126 and 128 and the terminals are designated respectively M2, B and B' and M3, C and C', though in the case of relays 62 and 63 as heretofore explained these circuits are open since there is no tone output from filters 59 and 60. Shaft 31A which is the output shaft of motor 31 is coupled to a shaft 65 on which is disposed spur gear 66. Also disposed coaxially with shaft 65 and free to rotate thereabout is a drum 67 which is composed of a spur gear center-section 68 and two adjacent sections 69 and 70 which have conductive material on the outside thereof which is insulated from the gear portion 68. Disposed on the shaft 65 and parallel with the drum 67 is a cylindrical layer 71 of conductive material which entirely surrounds that portion of the shaft 65 except for the slotted area 72 which is non-conductive. This conductive area 71 is of course insulated from the shaft 65 if 65 is of metallic material, or it can be printed on the shaft 65 or otherwise deposited thereon if the shaft 65 is made of dielectric material. It should be noted that the drum 67 is free to rotate coaxially about shaft 65, the motive power for such rotation being supplied by a D.C. motor 73 supplied by a D.C. source (not shown) which is coupled to the gear portion 68 of drum 67 by means of a spur gear 74. A brush 75 makes contact with conductive cylindrical segment 69 and a brush 76 makes contact with the conductive cylindrical segment 70 as drum 67 rotates. A brush 77 connected to the conductive segment 69 also contacts the conductive area 71 and a brush 78 connected to the conductive cylindrical segment 70 also contacts the conductive area in that part of the segment 70 where the non-conductive slot 72 is disposed, as the shaft 65 and the drum 67 rotate. A magnetic clutch 79 coupled shaft 65 to a shaft 80 disposed on the same axis as shaft 65. A magnetic clutch 81 couples shaft 80 to a shaft 82 which is disposed on the same axis as shaft 80 and 65. Disposed coaxially with shaft 82 is a drum 83 constructed in exactly the same manner as drum 67. Disposed parallel to drum 83 is a conductive area 84 embracing shaft 82. This conductive area is insulated from shaft 82 and may be formed in exactly the same manner as the conductive area 71 on shaft 65. The conductive area 84 is a cylinder of a length approximately half the length of the drum and has a tab 85 of similar conductive material which is an extension of the conductive area 84. The length of the tab is half the length of the drum 83. The total length then of area 84 and conductive tab 85 is substantially the length of the drum 83. Disposed on the shaft 82 is a spur gear 86 and disposed on the end of the shaft 84 is an azimuth indicator 87 which rotates with the rotation of shaft 82 about an azimuth dial (not shown). Some distance from the indicator 87 a spur gear 88 is coupled to the shaft 82. This spur gear 88 mates with a spur gear 89 which can be of the same diameter as gear 88. Gear 89 is fastened to a shaft 90 which is coupled to a shaft 91 that is the output shaft of a D.C. motor 92, by means of a magnetic clutch 93. D.C. motor 92 is supplied with power from a D.C. source 94. Brush 75 is connected to a terminal 95 that connects to a D.C. source 96, which in turn is coupled to a coil 97 of a relay 98. Relay 98 is a two pole single throw relay. The other terminal 99 of the relay coil 97 is connected to a brush 100 which contacts conductive strip 101 of drum 83. A brush 102 which contacts the other conductive strip 103 of drum 83 and the brush 76 of drum 67 connects to the output terminals 104 and 105 of relay 61. Terminal 106 of magnetic clutch 79 connects to terminal 107 of relay 61. Terminal 108 of magnetic clutch 81 is connected to terminal 109 which is coupled to relay 98 by means of a D.C. source 110. To complete the circuit for the magnetic relays 79 and 81 the other terminals thereof are connected to ground. It is thus seen that magnetic relay 790 is energized by D.C. source 64 and magnetic relay 81 is energized by D.C. source 110. Terminal 111 of magnetic clutch 93 is connected to terminal 112 of relay 98. Drum 83 is driven rotatively about shaft 82 by means of gear 113 coupled to the D.C. motor 73. It is evident that when shaft 65 is rotatively coupled to shafts 80 and 82 by means of magnetic relays 79 and 81 that the indicator 87 will rotate at the speed of rotation of shaft 65 which is controlled by the speed of rotation of the motor 31. This is the azimuth bearing indication condition that exists when the cardioid or fundamental radiation is being transmitted and received by the aircraft. For proper indication by the azimuth bearing indicator 87 when the third harmonic and the ninth harmonic radiations are sequentially being transmitted it is necessary that the speed of rotation of the shaft 82 be one third the rotation for the third harmonic and one ninth the rotation for the ninth harmonic. This is accomplished by means of two separate driving assemblies similar to the one just described for the fundamental radiation condition. It is also necessary that when the sequential radiations change from one pattern to another that the indicating shaft 82 be properly aligned with the driver shafts of the respective radiations; in the case of the fundamental radiation the driver shaft is the shaft 65 mentioned above.

The driver shaft combination for the third harmonic radiation condition comprises a shaft 114 to the end of which is fastened a spur gear 115 which mates with the spur gear 66 both gears being of the same diameter. An intermediate shaft 116 is coupled to the shaft 114 by means of a magnetic clutch 117. A third shaft 118 is coupled to shaft 116 by a magnetic clutch 119. At the end of shaft 118 is fastened a spur gear 120 which mates with the spur gear 86, the ratio of diameters of spur gear 120 to spur gear 86 is 1 to 3 to provide a reduction in rotation of shaft 82 by one third when it is driven by shaft 118. Drum 121 is similar in operation and construction to drum 67, conductive cylinder with slot 122 is likewise similar to conductive cylinder with slot 71, drum 123 is similar to drum 83 and conductive area 124 with tab extension is similar to conductive area 84 with tab extension 85. Brush 125 connects to terminal 126 and brush 127 connects to terminal 128, terminals 126 and 128 being contacts of relay 62. Terminal 129 of magnetic clutch 117 connects to terminal to 130 of relay 62 and terminal 131 of magnetic clutch 119 connects to D.C. power source 132 which is coupled in turn to terminal 133 of relay 134. Relay 134 is coupled to brush 135 by means of D.C. power source 136 and the other end of the coil of relay 134 is coupled to brush 137. Interior brush 138 couples through one conductive segment of drum 121 the brush 135 to the conductive cylinder 122 and interior brush 139 couples the other conductive segment of drum 121 and brush 125 to the conductive cylinder 122. Similar connections are made possible for drum 123 by means of brush 140 which is coupled to brush 127 by the drum conductive surface and to the conductive area 124 and brush 141 which couples brush 141 to the conductive tab segment 142 of the conductive area 124. Drum 121 is driven by the gear 143 which meshes with the gear portion of drum 121 and drum 123 is driven by gear 144. Gears 143 and 144 are connected by shaft 145 which is journaled by bearing 146. Lead 111 of magnetic clutch 93 is coupled to terminal 147 of relay 134.

For the condition of azimuth indication when the ninth harmonic is being transmitted there is provided a shaft 148 at the end of which is fastened a spur gear 149 that meshes with gear 66, the diameters and therefore the speed ratios of gear 149 and 66 being the same. Shaft 148 is coupled to shaft 149 lying along the same axis by magnetic clutch 150 and a third shaft 151 is coupled to shaft 149 by means of magnetic clutch 152. At the end of shaft 151 is fastened a spur gear 153 which drives gear 86 through idler 154. The speed ratio of gear 153 to idler 154 is one to one and the speed ratio of gear 153 to gear 86 is one to nine so that when gear 153 is driving gear 86, shaft 82, the azimuth indication shaft, will rotate at one-ninth speed of the fundamental speed. A drum 155 similar to drum 67 is disposed about shaft 148 parallel to the conductive area 156 similarly constructed to conductive area 71 and a drum 157 similar to drum 83 is disposed about shaft 151 and conductive area with tab 158 which is similar to conductive area 84 is disposed on the shaft 151 in parallel relation to drum 157. The brush arrangement for this condition is similar to the brush arrangement for the fundamental radiation and the third harmonic radiation conditions described above. Also the relay connections are similarly devised.

As stated above it is essential for proper bearing indication that the shaft 82 which carries the bearing indication pointer 87 be exactly lined up with shaft 65 to provide the proper bearing indication for any one of the three transmitted radiation conditions. This is effected in the following manner. Assume that the fundamental cardioid radiation is being transmitted. The 500 c.p.s. signal is filtered and actuates relay 61 which is shown in the energized condition. Power source 64 connected to terminal 106 of magnetic clutch 79 through terminal 107 energizes the clutch to couple shaft 80 to shaft 65 which is connected to shaft 31A of motor 31. Magnetic clutch 81 is energized because it is connected to terminal 109 and battery source 110 which circuit is complete, therefore, shaft 82 will rotate in unison with shafts 80 and 65. Drums 67 and 83 are both rotating at the speed of the D.C. motor which can be any desired speed for effective operating condition. If brush 78 is not on the slot 72 at the same time that brush 100 is on the tab 85, the 3 shafts rotate until a position is reached where brush 78 is on a conductive surface and brush 100 contacts the tab 85. During this time, which is comparatively short and dependent on the speed of the D.C. motor 73, the circuit through relay 61 terminals 104 and 105 to brush 76, thence to brush 78 and brush 77 and brush 75 to terminal 95, and from brush 102, to brush 102' through the tab 85 to brush 100 to brush 100' which connects to terminal 99 of relay 98 the circuit is complete and relay 98 is energized breaking the circuit of the magnetic clutch 81 which uncouples shaft 82 from shaft 80. At the same time the magnetic clutch 93 is energized thereby coupling shaft 90 to 91 and allowing gear 89 to drive gear 88 to thereby turn shaft 82. This provides for a rotation of the shaft 82 equivalent through an angular distance that is determined by the width of the tab 85. As soon as this degree of rotation is achieved, then brush 100 breaks contact with tab 85 which then breaks the circuit through relay 98 causing magnetic clutch 81 to be energized again and magnetic clutch 93 to be de-energized. Shaft 82 is then recoupled to shaft 80 turns again with shaft 65 and is unaffected now by any rotation of the D.C. motor 92. This process will continue in a series of short impulses or kicks until tab 85 will line up with slot 72 when the circuit through relay 98 is broken and the shaft 82 will rotate in the properly indexed position with shaft 65 for the appropriate azimuth bearing indication. If we assume that the width of the tab 85 and the slot 72 is for example 10 degrees then it is evident that it may take about 36 impulses for the two shafts to line up in the position where the tab 85 and slot 72 are properly aligned. As stated before the speed of the D.C. motor 73 can be any desired speed so that this indexing process will occur in a relatively short time and the proper azimuth bearing indication can be quickly achieved. The purpose of the D.C. motor 92 is to provide the necessary rotation for the proper alignment of the shaft 82 with the driver shaft 65. The line up process just described for the fundamental of a cardioid radiation is the same procedure that holds true when any of the other harmonic radiations are transmitted and the operation of the respective drums and magnetic clutches for the particular shafts concerned is exactly similar to what was described above for the fundamental radiation condition. FIGURE 5A shows in expanded scale the conductive area 71 and FIG. 5B shows the conductive area 85. The slot 72 is made wider than the width of the brush 78 which is shown in the cross sectional view for the purpose of illustration. In the case of the conductive tabe 85 the brush 100 must be wider than the tab 85 so that portions of it will overlap the conductive tab 85 onto the nonconductive portion of the shaft 82.

Another embodiment of this invention is shown in FIGURE 6 taken in conjunction with relevant portions of FIGURE 3. In this embodiment three separate azimuth indicators with associated circuitry similar to that described in the conventional VOR receiver is provided to allow for a wholly electronic embodiment of this invention. With reference to FIGURE 6 there is shown the cathode follower circuits 25 to the input grids of which are coupled the reference voltage output of phase splitter 24. The output of the 500 c.p.s. filter designated as X is coupled to the coil of a relay 61' which is a two pole single throw relay. The output of filter 59 designated as Y is coupled to the coil of a relay 62' similar to relay 61' and the output of filter 60 designated as Z is coupled to the coil of relay 63' similar to relay 62'. The cathode output of a tube 160 is coupled to terminal 161 of relay 61' terminal 162 of relay 62' and terminal 163 of relay 63'. The cathode output of tube 164 is coupled to terminal 165 of relay 61' terminal 166 of relay 62' and terminal 167 of relay 63'. The relay connections are so arranged that each set of cathode follower output voltages are fed into the stationary coil 27 of phase shifters 28 which are alike in all cases. Those elements of the block diagram of FIGURE 3 and closed by the broken line 168 are indicated similarly in the broken line 168 similarly in FIGURE 6. The operation of this circuitry has already been described and will not be repeated here. If we now assume that the fundamental or cardioid radiation is being transmitted then there is an output from the 500 c.p.s. filter 58 which energizes relay 61' to complete the circuit from the cathode follower output 25 through the stationary coils 27 of the phase shifter 28 in the manner previously explained, and after passing through the successive circuitry will cause an indication on the coarse azimuth indicator 169. When the ninth harmonic radiation is being transmitted there will be an output of the 1000 c.p.s. filter 60 which will energize relay 63' that in turn will provide for an indication on the fine azimuth indicator 170. In using harmonics it must be borne in mind that there will be as many ambiguities as the order of the harmonic. The ambiguities must be removed by a coarse indication whose limits are within the tolerance of a single cycle of the harmonic. In the instant case the indication provided by the radiation of the third harmonic can be used to resolve any ambiguities that would occur in the fine azimuth indication. It is apparent that when the ninth harmonic radiation is being received it is possible to get an indication from any one of the nine lobes and it would be difficult to determine in which sector the aircraft is located unless some indication is provided as to which lobe of the radiation is scanning the proper spectrum. This as previously said will be provided for by the indication of the third harmonic.

While this invention has been illustrated with one fundamental and two harmonics it is apparent that similar results can be achieved with a fundamental and one harmonic or with a fundamental and more than two harmonics and this invention is not to be construed as limited only to the illustrations provided here for descriptive purposes.

While I have described above the principles of my invention in connection with specific apparatus, it is to be clearly understood that this description is made only by way of example and not as a limitation to the scope of my invention.

I claim:

1. An omnirange transmitter system comprising means to transmit sequentially rotating electro-magnetic radiation patterns at a fundamental frequency and at least one other frequency which is a harmonic of said fundamental frequency, and a source of signals coupled to said transmitting means whereby each of said radiations contains reference phase signals and variable phase signals.

2. An omnirange transmitter system comprising means to transmit sequentially a lobed radiation pattern at a fundamental frequency and at least one multilobed radiation pattern at a second frequency which is a harmonic of said fundamental frequency, means to rotate said lobed radiation pattern at a desired rate, and means to rotate said multilobe radiation pattern at a rate proportional to said desired rate which is the inverse of the order of said harmonic frequency each of said radiations containing reference phase signals and variable phase signals.

3. An omnirange transmitter system comprising means to transmit sequentially rotating electro-magnetic radiation patterns at a fundamental frequency and at least a second frequency which is a harmonic of said fundamental frequency, each of said radiations containing reference phase signals and variable phase signals, said transmitting means for each sequential radiation comprising an omnidirectional antenna and means associated with said omnidirectional antenna to produce said fundamental frequency radiation pattern or said harmonic frequency radiation patterns, means to rotate said fundamental frequency pattern at a desired rate, and means to rotate said harmonic frequency patterns at a rate proportional to said desired rate that is the inverse of the order of said harmonic frequency.

4. An omnirange radio receiver for indicating the bearing from a receiving point to a beacon emitting sequentially transmitted rotating electromagnetic radiation pattern at a fundamental frequency and at least one other frequency which is a harmonic of said fundamental frequency, each of said radiations containing reference phase signals and variable phase signals, comprising means to receive and detect said reference phase signals and said variable phase signals of said fundamental frequency radiation and said harmonic frequency radiation and means responsive to the detection of said reference phase signals and said variable phase signals to indicate the bearing of said receiver relative said beacon.

5. An omnirange radio receiver for indicating the bearing of a receiving point to a beacon emitting sequentially transmitted rotating electromagnetic radiation patterns at a fundamental frequency and at least one other frequency which is a harmonic of said fundamental frequency, each of said radiations containing reference phase signals, variable phase signals and a characteristic modulation signal, comprising means to detect from said fundamental and harmonic radiations said reference phase signals, said variable phase signals and said characteristic modulation signals, means responsive to the characteristic modulation signal of each said radiation to produce an error signal proportional to the phase difference between the reference phase signals and the variable phase signals of each said radiation and means responsive to said error signal to indicate the bearing of said receiver relative said beacon.

6. An omnirange navigation system for determining the bearing of an object relative to a transmitter comprising means to transmit sequentially rotating electromagnetic radiation patterns at a fundamental frequency and at least one other frequency which is a harmonic of said fundamental frequency, each of said radiations containing reference phase signals and variable phase signals, means carried by said object to receive said sequential radiations, and means responsive to said reference phase signals and said variable phase signals of said fundamental frequency radiation and said harmonic frequency radiation to indicate the bearing of said object relative said transmitter.

7. An omnirange navigation system for determining the bearing of an object relative to a transmitter comprising means to transmit sequentially rotating electromagnetic radiation patterns at a fundamental frequency and at least one other frequency which is a harmonic of said fundamental frequency, each of said radiations containing reference phase signals and variable phase signals, said transmitting means for each sequential radiation comprising an omnidirectional antenna and means associated with said omnidirectional antenna to produce said fundamental frequency radiation pattern or said harmonic frequency radiation pattern, means to rotate said fundamental frequency pattern at a desired rate, means to rotate said harmonic frequency pattern at a rate proportional to said desired rate that is the inverse of the order of said harmonic frequency, means carried by said object to receive said sequential radiations and means responsive to said reference phase signals and said variable phase signals of said fundamental frequency radiations and said harmonic frequency radiations to indicate the bearing of said object relative said transmitter.

8. An omnirange navigation system for determining the bearing of an object relative to a transmitter comprising means to transmit sequentially rotating electromagnetic radiation patterns at a fundamental frequency and at least one other frequency which is a harmonic of said fundamental frequency, each of said radiations containing reference phase signals and variable phase signals, said transmitting means for each sequential radiation comprising an omnidirectional antenna and means associated with said omnidirectional antenna to produce said fundamental frequency radiation pattern or said harmonic frequency radiation pattern, means to rotate said fundamental frequency pattern at a desired rate, means to rotate said harmonic frequency pattern at a rate proportional to said desired rate that is the inverse of the order of said harmonic frequency, means to generate a carrier frequency signal, means to frequency modulate said carrier frequency signal at a rate equal to said desired rate of rotation, means to sequentially couple said frequency modulated carrier signal to each said omnidirectional antenna, means to sequentially couple the unmodulated carrier signal to each associated means, a tone generator having at least first and second outputs, said first output having a different frequency from said second output, means to sequentially couple said first and second outputs respectively to said frequency modulated carrier, and timing means to control the sequence and duration of the transmission of said fundamental radiations and harmonic frequency radiations and to couple said first and second outputs respectively of said time generator to said frequency modulated carrier signal in synchronization with the time of transmission of said fundamental and harmonic frequency radiations, means carried by said object to receive said sequential radiations and means responsive to said reference phase signals and said variable phase signals of said fundamental frequency radiations and said harmonic frequency radiations to indicate the bearing of said object relative said transmitter.

9. An omnirange navigation system for determining the bearing of an object relative to a transmitter comprising means to transmit sequentially rotating electromagnetic radiation patterns at a fundamental frequency and at least one other frequency which is a harmonic of said fundamental frequency, each of said radiations containing reference phase signals and variable phase signals, said transmitting means for each sequential radiation comprising an omnidirectional antenna and means associated with said omnidirectional antenna to produce said fundamental frequency radiation pattern or said harmonic frequency radiation pattern, means to rotate said fundamental frequency pattern at a desired rate, means to rotate said harmonic frequency pattern at a rate proportional to said desired rate that is the inverse of the order of said harmonic frequency, means to generate a carrier frequency signal, means to frequency modulate said carrier frequency signal at a rate equal to said desired rate of rotation, means to sequentially couple said frequency modulated carrier signal to each said omnidirectional antenna, means to sequentially couple the unmodulated carrier signal to each said associated means, a tone generator having at least first and second outputs, said first output having a different frequency from said second output, means to sequentially couple said first and second outputs respectively to said frequency modulated carrier, timing means to control the sequence and duration of the transmission of said fundamental radiations and harmonic frequency radiations and to couple said first and second outputs respectively of said time generator to said frequency modulated carrier signal in synchronization with the time of transmission of said fundamental and harmonic frequency radiations, receiving means carried by said object to detect from said fundamental and harmonic radiation said reference phase signals, said variable phase signals and said first and second outputs of said tone generator, means to compare the phase difference of said variable phase signals relative said reference phase signals and produce an error voltage therefrom, an azimuth indicator, a motor, means coupling said error voltage to said motor to energize said motor, means responsive to said first and second outputs and coupled to the output of said motor to cause said azimuth indicator to display sequentially the bearing of said object relative said transmitter in response to the phase difference between the reference phase signals and the variable phase signals respectively of said fundamental and harmonic frequency radiations.

10. In a VOR navigation system using a beacon transmitting a rotating cardioid radiation pattern, said radiation containing reference phase signals and variable phase signals and a receiver carried by an aircraft and adapted to receive said signals and derive a phase difference error voltage therebetween, and azimuth indication means to indicate the bearing of said aircraft relative said beacon as a function of said phase difference, the improvement in said transmitter comprising means for transmitting sequentially a cardioid radiation pattern rotating at a desired rate and at least one multilobed radiation pattern rotating at a rate proportional to said desired rate which is the inverse of the number of lobes in said multilobed pattern, each of said radiations containing reference phase signals and variable phase signals and a characteristic modulation signal; the improvement in the receiver comprising means to detect and separate said characteristic modulation signals and means responsive to said characteristic modulation signals and the phase difference voltage between the reference phase signals and the variable phase signals of the related radiations of said cardioid pattern and said multilobed pattern to cause said azimuth indication means to indicate respectively the coarse and the fine bearing of said aircraft relative said transmitter.

11. In a VOR navigation system using a beacon transmitting a cardioid radiation pattern rotating at a desired rate, said radiation including reference phase signals and variable phase signals, and a receiver carried by an aircraft and adapted to receive said signals and derive a phase difference error voltage therebetween, a motor energized by said error voltage and an azimuth indicator shaft coupled to the output of said motor to indicate the bearing of said aircraft relative said beacon as a function of said phase difference; the improvement in said transmitter comprising means to transmit sequentially, a cardioid radiation pattern rotating at said desired rate and at least one multilobed radiation pattern rotating at a rate proportional to said desired rate which is the inverse of the number of lobes in said multilobed pattern, each of said radiations including reference phase signals, variable phase signals and a characteristic modulation signal; the improvement in said receiver comprising means to detect and separate said characteristic modulation signals, first and second means coupling said azimuth indicator to said motor output, said first coupling means being responsive to the characteristic modulation signals of said cardioid pattern to couple said azimuth indicator shaft to the output of said motor during the transmission and reception of said cardioid pattern radiation to produce a coarse indication of the bearing of said aircraft relative said transmitter, and said second shaft coupling means being responsive to the characteristic modulation signal of said multilobed pattern to couple said azimuth indicator shaft to said motor output during the transmission and reception of said multilobed pattern radiation of said aircraft relative said transmitter.

12. In a VOR navigation system including a beacon transmitting a cardioid radiation pattern rotating at a desired rate, said radiation containing reference phase signals and variable phase signals and a receiver carried by an aircraft and adapted to receive said signals and derive a phase difference error voltage therebetween, a motor energized by said error voltage and an azimuth indicator shaft coupled to the output of said motor to indicate the bearing of said aircraft relative said beacon as a function of said phase difference; the improvement in said transmitter comprising means to transmit sequentially a cardioid radiation pattern and first and second multilobe patterns, each of said radiations containing reference phase signals, variable phase signals and a characteristic modulation signal, said cardioid pattern rotating at said desired rate and said first and second multilobed patterns rotating at rates respectively proportional to said desired rate which are the inverse of the number of lobes in each said multilobe radiation patterns; the improvement in the receiver comprising means to detect and separate said characteristic modulation signals a plurality of means coupling said azimuth indicator shaft to said motor output, each said shaft coupling means being responsive to the characteristic modulation signal of one of said radiation patterns to couple said azimuth indicator shaft to said motor output during the transmission and reception of the said radiation pattern to produce a bearing indication of said aircraft relative said transmitter, said cardioid radiation pattern producing a coarse indication of the bearing of said aircraft relative said transmitter, and said multilobe radiation patterns producing fine indications of the bearing of said aircraft relative said transmitter and said radiation pattern of a lower order of lobes will resolve the bearing ambiguity of the bearing indication of the radiation pattern of the higher order of lobes.

13. In a VOR navigation system including a beacon transmitting a cardioid radiation pattern rotating at a desired rate, said radiation containing reference phase signals and variable phase signals, and a receiver carried by an aircraft and adapted to receive and detect said signals and derive a phase difference error voltage therebetween and azimuth indication means responsive to said error voltage to produce a bearing indication of said aircraft relative said beacon; the improvement in said beacon comprising means to transmit sequentially a cardioid radiation pattern and a plurality of multilobe radiation patterns, each of said radiations containing reference phase signals, variable phase signals and a characteritic modulation signal, said cardioid pattern rotating at said desired rate and each of said plurality of multilobe patterns rotating at a rate proportional to said desired rate which is the inverse of the number of lobes in that multilobe pattern; the improvement in the receiver comprising means to detect and separate said characteristic modulation signals, separate means for each said sequentially transmitted radiation pattern responsive to the characteristic modulation signal of that radiation pattern to derive an error voltage indicative of the phase difference between the reference phase signals and the variable phase signals of that radiation pattern, and separate azimuth indication means responsive to each said error voltage output to produce separate bearing indications of said aircraft relative said transmitter radiation pattern during the transmission and reception of the signals of said radiation pattern.

14. An azimuth indicator for a receiver carried by an aircraft and responsive to omnirange navigation system utilizing sequentially transmitted signals of a fundamental frequency and at least a second frequency, which is a harmonic of said fundamental frequency each said sequentially transmitted signal having a characteristic modulation signal, said receiver including means to derive an error signal indicative of the bearing of said aircraft relative said transmitter, and a motor energized by said error signal, a driver shaft coupled to said motor, an azimuth pointer coupled to a pointer shaft, a plurality of shaft coupling means, each of said shaft coupling means being responsive to the characteristic modulation signal of one of said sequentially transmitted signals, each said shaft coupling means comprising a first shaft coupled to said driver shaft and driven thereby at the same rate of speed, a second shaft, means coupling said first shaft to said second shaft in axial coincidence therewith and to said pointer shaft to drive said pointer shaft at a rate which is inversely proportional to the harmonic order of the frequency of the signal to which said shaft coupling means is responsive and means associated with each said shaft coupling means to align said pointer shaft with said driver shaft.

15. An azimuth indicator according to claim 14 further comprising first magnetic clutch means including first and second magnetic clutches coupling said second shaft to said first shaft, first conductive alignment means disposed on said first shaft, second conductive alignment means disposed on said second shaft, means associated with said first and second shafts to couple said first alignment means to said second alignment means, means responsive to said characteristic modulation signals to energize said first magnetic clutch of said first magnetic clutch means to cause said second shaft to rotate in synchronism with said first shaft, motive means, means including second magnetic clutch means coupling said motive means to said pointer shaft, means responsive to the completion of a circuit through said first and second conductive alignment means and said coupling means therefor to cause non-energization of said first magnetic clutch means and activation of said second magnetic clutch means to couple said motive means to said pointer shaft and cause said pointer shaft to rotate in synchronism with said motive means until said circuit is broken and said motive means is uncoupled from said pointer.

16. An azimuth indicator according to claim 15 wherein said first conductive alignment means includes a non-conductive slot axially of said first shaft and said second conductive alignment means includes a conductive tab axially of said second shaft and said circuit is broken when said slot is aligned axially with said tab whereby said pointer shaft assumes the position of desired alignment with said driver shaft.

No references cited.